(12) United States Patent
Magnus et al.

(10) Patent No.: US 6,817,437 B2
(45) Date of Patent: Nov. 16, 2004

(54) STEER-BY WIRE HANDWHEEL ACTUATOR

(75) Inventors: Brian J. Magnus, Frankenmuth, MI (US); Michael J. Augustine, Mayville, MI (US); Michael J. Cole, Saginaw, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/163,927

(22) Filed: Jun. 6, 2002

(65) Prior Publication Data

US 2002/0189888 A1 Dec. 19, 2002

Related U.S. Application Data

(60) Provisional application No. 60/299,342, filed on Jun. 19, 2001.

(51) Int. Cl.$^7$ ................................................. B62D 5/04
(52) U.S. Cl. ....................................... 180/403; 180/443
(58) Field of Search ................................. 180/402, 403, 180/443, 446, 422, 444; 70/41, 43

(56) References Cited

U.S. PATENT DOCUMENTS

| | | | | |
|---|---|---|---|---|
| 4,771,846 A | * | 9/1988 | Venable et al. ............. 180/422 |
| 4,860,844 A | | 8/1989 | O'Neil ...................... 180/79.1 |
| 5,097,917 A | * | 3/1992 | Serizawa et al. ........... 180/402 |
| 5,228,757 A | | 7/1993 | Ito et al. ..................... 303/100 |
| 5,251,135 A | | 10/1993 | Serizawa et al. ...... 364/424.05 |
| 5,347,458 A | | 9/1994 | Serizawa et al. ...... 364/424.05 |
| 5,374,877 A | | 12/1994 | Imaseki et al. ............... 318/34 |
| 5,473,225 A | | 12/1995 | Miyazaki ..................... 318/52 |
| 5,576,957 A | | 11/1996 | Asanuma et al. ...... 364/424.05 |
| 5,653,304 A | | 8/1997 | Renfroe ...................... 180/402 |
| 5,667,715 A | | 9/1997 | Foister .................... 252/62.52 |
| 5,668,722 A | | 9/1997 | Kaufmann et al. ........... 701/41 |
| 5,740,040 A | | 4/1998 | Kifuku et al. ......... 364/424.05 |
| 5,803,202 A | * | 9/1998 | Bohner et al. ............... 180/443 |
| 5,823,309 A | | 10/1998 | Gopalswamy et al. ...... 192/21.5 |
| 5,828,972 A | | 10/1998 | Asanuma et al. ............. 701/41 |
| 5,829,547 A | | 11/1998 | Fujii et al. ................... 180/422 |
| 5,845,752 A | | 12/1998 | Gopalswamy et al. ...... 192/21.5 |
| 5,848,678 A | | 12/1998 | Johnston et al. ............ 192/21.5 |
| 5,896,942 A | * | 4/1999 | Bohner et al. ............... 180/402 |
| 5,896,965 A | | 4/1999 | Gopalswamy et al. ...... 192/21.5 |
| 5,925,083 A | | 7/1999 | Ackermann ................... 701/41 |
| 6,018,691 A | | 1/2000 | Yamamoto et al. ........... 701/41 |
| 6,097,286 A | | 8/2000 | Discenzo .................... 340/465 |
| 6,098,296 A | | 8/2000 | Perisho, Jr. et al. .......... 33/203 |
| 6,102,151 A | | 8/2000 | Shimizu et al. ............. 180/446 |
| 6,152,254 A | | 11/2000 | Phillips ...................... 180/422 |
| 6,176,341 B1 | | 1/2001 | Ansari ........................ 180/402 |

(List continued on next page.)

FOREIGN PATENT DOCUMENTS

| | | | | |
|---|---|---|---|---|
| EP | 0278366 B1 | 2/1988 | ........... B62D/6/00 |
| EP | 0858408 B1 | 10/1996 | ........... B62D/5/06 |
| EP | 0985591 A2 | 8/1999 | ........... B62D/5/06 |
| GB | 2341588 A | 2/2000 | ........... B62D/5/32 |
| JP | 60259570 | 12/1985 | ........... B62D/7/14 |
| JP | 1115778 | of 1989 | |
| JP | 8034353 | 2/1996 | ........... B62D/1/12 |
| WO | 00/34106 | 5/2000 | ........... B62D/1/06 |

OTHER PUBLICATIONS

J.Y. Wong, Ph.D., "Chapter Five: Handling Characteristics of Road Vehicles," *Theory of Ground Vehicles*, 1978, pp. 210–214.

Primary Examiner—Anne Marie Boehler
(74) Attorney, Agent, or Firm—Michael D. Smith (57) ABSTRACT

A steer-by-wire handwheel actuator in a vehicle is presented. The handwheel actuator comprises a driver input shaft; a gear train connected to the driver input shaft; a motor responsive to control signals from a controller and variably geared to the gear train; a electro-mechanical brake responsive to the control signals from the controller and geared to one of the driver input shaft and the gear train; and a stop mechanism attached to a housing and coupled to one of the electro-mechanical brake and the gear train.

40 Claims, 9 Drawing Sheets

U.S. PATENT DOCUMENTS

| | | | |
|---|---|---|---|
| 6,179,394 B1 | 1/2001 | Browalski et al. | 303/146 |
| 6,208,923 B1 | 3/2001 | Hommel | 701/402 |
| 6,279,674 B1 | 8/2001 | Lissel et al. | 180/402 |
| 6,279,675 B1 | 8/2001 | Bohner et al. | 180/403 |
| 6,283,243 B1 | 9/2001 | Bohner et al. | 180/406 |
| 6,283,859 B1 * | 9/2001 | Carlson et al. | 463/36 |
| 6,285,963 B1 | 9/2001 | West | 701/41 |
| 6,298,940 B1 | 10/2001 | Bohner et al. | 182/403 |
| 6,339,419 B1 * | 1/2002 | Jolly et al. | 345/156 |
| 6,389,343 B1 * | 5/2002 | Hefner et al. | 701/41 |
| 6,547,031 B1 * | 4/2003 | Magnus | 180/444 |
| 6,585,540 B2 * | 7/2003 | Gutierrez et al. | 439/620 |
| 2002/0005315 A1 * | 1/2002 | Kind et al. | 180/444 |

\* cited by examiner

STEER-BY WIRE HANDWHEEL ACTUATOR

CROSS-REFERENCE TO RELATED APPLICATIONS

This application claims the benefit of U.S. provisional application No. 60/299,342, filed Jun. 19, 2001 the contents of which are incorporated by reference herein in their entirety.

TECHNICAL FIELD

This invention relates to a steer-by-wire system, and more particularly to a steer-by-wire handwheel actuator.

BACKGROUND

It is known in the art to have a steering system with mechanical linkage from the steering wheel to the steerable road wheels. Even with power assist, the driver of a mechanically linked vehicle can feel the forces of the road against the steerable wheels through the steering wheel. Indeed, this is a desired feature of direct linkage and is sought out by purchasers of high performance vehicles in the form of so-called "rack-and-pinion" steering. The road forces felt in the steering wheel give the driver feedback he can use to anticipate and control the vehicle, or at least create the comfortable feeling that he is in control of the vehicle. Remove this feedback, such as in the case of "mushy" power steering, and the driver will have the uncomfortable feeling of being separated from the road wheels, not quite in control, and will tend to oversteer his vehicle, particularly in demanding situations such as sharp or sudden turns.

By definition, a steer-by-wire system has no mechanical link connecting the steering wheel from the road wheels. In effect, the steering wheel is little more than a joystick, albeit an extremely sophisticated joystick. Exemplary of such known steer-by-wire systems is commonly-assigned U.S. Pat. No. 6,176,341, issued Jan. 23, 2001 to Ansari, which is wholly incorporated herein by reference. What is needed is to provide the steer-by-wire driver with the same "road feel" that a driver receives with a direct mechanical link. Furthermore, it is desirable to have a device that provides a mechanical back up "road feel" in the event of multiple electronic failures in the steer-by-wire system. In addition, a device that provides positive on-center feel and accurate torque variation as the handwheel is rotated is also desirable. Existing steer-by-wire devices produce excessive lash, excessive noise and insufficient over-load torque capability as the handwheel is rotated to its end of travel in either direction.

BRIEF SUMMARY

A steer-by-wire steering system is defined as a steering system with no mechanical connection between a steering wheel and a set of steering gears or actuators. Such systems are advantageous because they permit auto and other vehicle designers great latitude in use of space that would normally be taken up by mechanical linkages, among other reasons.

In an exemplary embodiment of the invention, a steer-by-wire handwheel actuator is described, which provides feedback of road forces to the operator of a steer-by-wire vehicle. A handwheel actuator comprises a driver input shaft; a gear train connected to the driver input shaft; a motor responsive to control signals from a controller and connected to the gear train; an electro-mechanical brake responsive to the control signals from the controller and connected to one of the driver input shaft and the gear train; and a stop mechanism attached to a housing and coupled to one of the electro-mechanical brake and the gear train.

DETAILED DESCRIPTION OF THE PREFERRED EMBODIMENT

Figure 1:
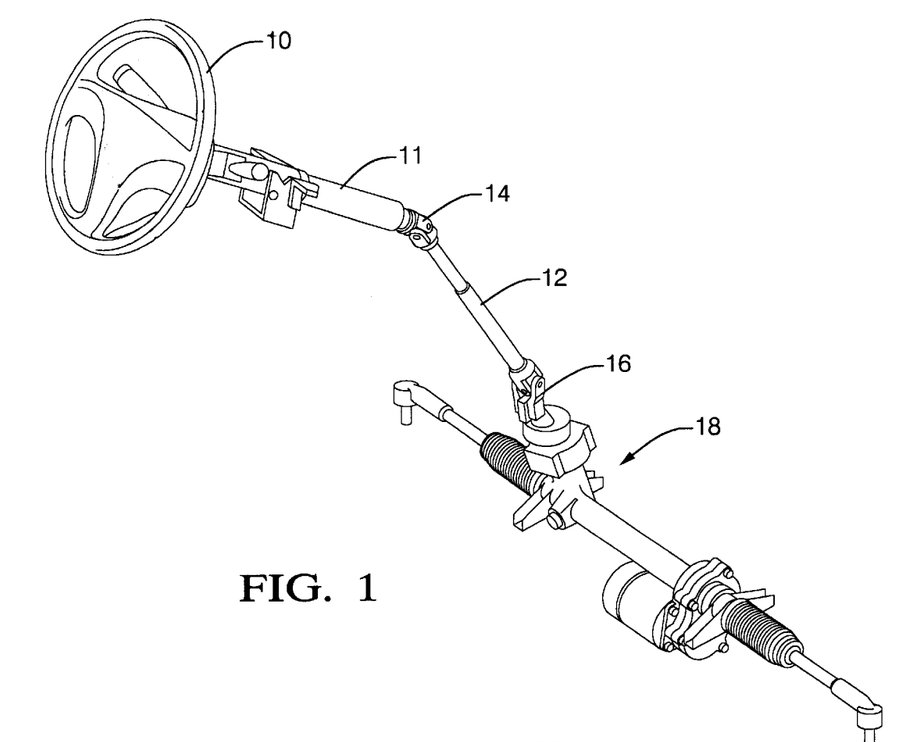
FIG. 1 is a perspective view of a prior art hard contact driving system.

Referring to FIG. 1, a typical prior art steering system is depicted. A steering wheel 10 is connected to a steering column 11 which in turn is connected to a steering intermediate shaft 12 via universal joint 14. Another universal joint 16 couples intermediate steering shaft 12 to an electric power steering assist assembly (rack assist) 18. It is evident that mechanical direct connection exists throughout the prior art driving system.

Figure 2:
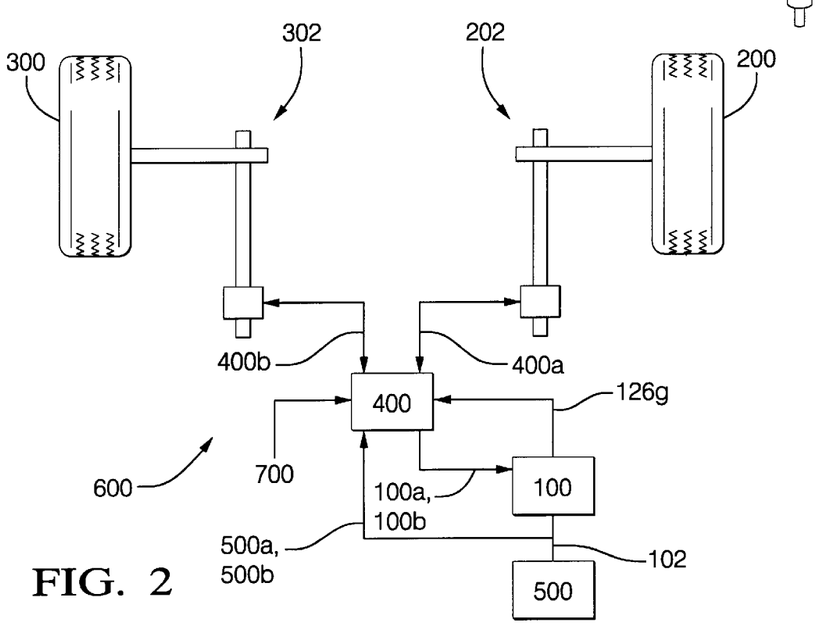
FIG. 2 is a schematic representation of the steer-by-wire handwheel actuator in signal communication with a steer-by-wire steering system.

FIG. 2 is a schematic representation of a steer-by-wire steering system 600 as it is comprises a controller 400, a first electro-mechanical actuator 202 and a second electro-mechanical actuator 302, each actuator 202, 302 in signal communication 400a, 400b with the controller 400. In one embodiment, the first and second electro-mechanical actuators 202, 302 comprising a motor, crank arm, steering arm and tie rod, are in turn connected respectively to a first wheel 200 and a second wheel 300 and are operative thereby to steer the wheels 200, 300 under the command of the controller 400. In another embodiment, it will be appreciated by one skilled in the pertinent art that one actuator is optionally linked to both road wheels 200, 300 to operably steer wheels 200, 300 using one motor to actuate the sole actuator.

Still referring to FIG. 2, a handwheel actuator 100 of the present disclosure is in signal communication 100a, 100b with the controller 400 of the steer-by-wire steering system 600. Handwheel actuator 100 is in further communication with an external motive source 500, such as a driver from whom the handwheel actuator 100 receives steering commands by way of a driver input shaft 102. The controller 400 is also operative to receive as input thereto a signal 700 indicative of vehicle velocity, as well as a signal 500a indicative of the position of the driver input shaft 102 and a signal 500b indicative of the torque on the driver input shaft 102. Signals 500a and 500b are generated from sensors disposed in handwheel actuator 100 proximate shaft 102.

Figure 3:
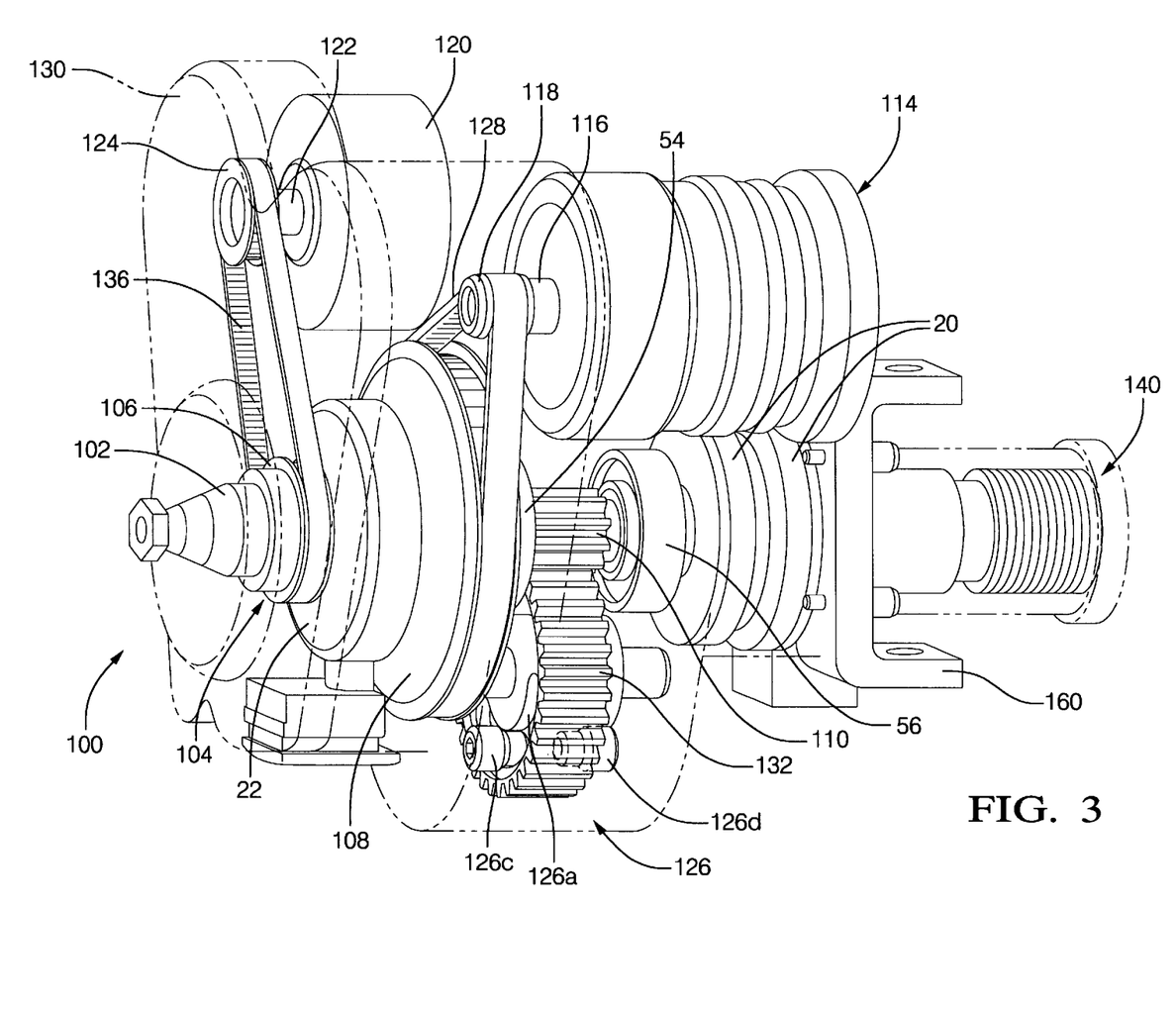
FIG. 3 is a perspective view of an exemplary embodiment of a steer-by-wire handwheel actuator.

With reference to FIG. 3, therein depicted is a representation of the handwheel actuator 100 of a preferred embodiment. The handwheel actuator 100 includes a housing 130, a driver input shaft 102 and a gear train 104 coupled to the driver input shaft 102. In the interest of clarity, the gear train 104 comprises a driver feedback pulley 106, a speed reducer pulley 108, and a spur gear 110 (See also FIG. 7, as gear train 104 is shaded completely). The driver input shaft 102 is rotatably positioned between an upper bearing 54 and a lower bearing 56, and position sensors 20 and torque sensor 22 operably connected to driver input shaft 102. Position sensors 20 electronically detect the angular position of the driver input shaft 102, while the torque sensor 22 electronically detects and evaluates the torsional force acting on the driver input shaft 102. The angular displacement of the hand steering wheel 10 is detected by sensors 20, 22, processed, and applied to a servo motor (not shown) to move steerable wheels (not shown). The handwheel actuator 100 of FIGS. 3 and 6 includes an electric motor 114 having a motor shaft 116 rotatively driven by the motor 114. Attached or optionally formed into the motor shaft 116 is a motor pulley 118. Attached to the motor pulley 118 is a belt 128 positively driving pulley 108 of the gear train 104. Continuing in FIG. 3 in conjunction with FIG. 7, the handwheel actuator 100 further includes an electro-mechanical brake 120 having an electro-mechanical brake shaft 122 rotatively controlled by the electro-mechanical brake 120. Attached or optionally formed into the electro-mechanical brake shaft 122 is a pulley 124 driving a belt 136 operably connected to the gear train 104. More specifically, the belt 136 is connected to the driver feedback pulley 106 in an exemplary embodiment.

It should be noted that a preferred embodiment of the handwheel actuator utilizes an electric sine commutated brushless motor 114 for its primary power transmission because the sine wave commutation provides for a low torque ripple. Furthermore, it is preferred that the belt 128 used to transmit the power from the motor 114 is a small-cogged belt to provide positive drive, high efficiency, low noise, and nearly zero lash. In using a cogged belt, it has been found to yield approximately 98% efficiency. In addition, a preferred embodiment uses a magnetic particle brake for the electro-mechanical brake 120, however alternative embodiments also include electro-rheological fluid devices.

Magnetorheological fluids suitable for use in the handwheel actuator 100 are disclosed in U.S. Pat. Nos. 5,896, 965, issued Apr. 27, 1999, to Gopalswamy et al. for a Magnetorheological Fluid Fan Clutch; 5,848,678, issued Dec. 15, 1998, to Johnston et al. for a Passive Magnetorheological Clutch; 5,845,752, issued Dec 8, 1998, to Gopalswamy et al. for a Magnetorheological Fluid Clutch with Minimized Resistance; 5,823,309, issued Oct. 20, 1998, to Gopalswamy et al. for a Magnetorheological Transmission Clutch; and 5,667,715, issued Sep. 16, 1997, to Foister, R. T. for Magnetorheological Fluids; the disclosures of all of which are incorporated herein by reference in their entirety. An alternative embodiment utilizing an electro-rheological fluid device having magnetorheological fluid for obtaining a variable resistance to the driver input shaft is disclosed in Patent Application number DP-300272, entitled "Variable Road Feedback Device For Steer-By-Wire System."

It is to be noted that utilizing a magnetic particle brake or a magnetorheological fluid device provides virtually no resistance to a driver input shaft when there is no magnetic force induced by a control module. However, when it becomes desirable to give the vehicle operator a feel of the road, a control module energizes a magnetic field in the magnetic particle brake or the magnetorheological fluid device causing the magnetic particle brake or the magnetorheological fluid device in turn to provide variable passive resistance. The variable passive resistance along with active resistance provided by the electric motor gives the vehicle operator a feel of the road by transferring the resistance upon the steering wheel. Thus, causing the vehicle operator to "feel" or sense the road.

Figure 8:
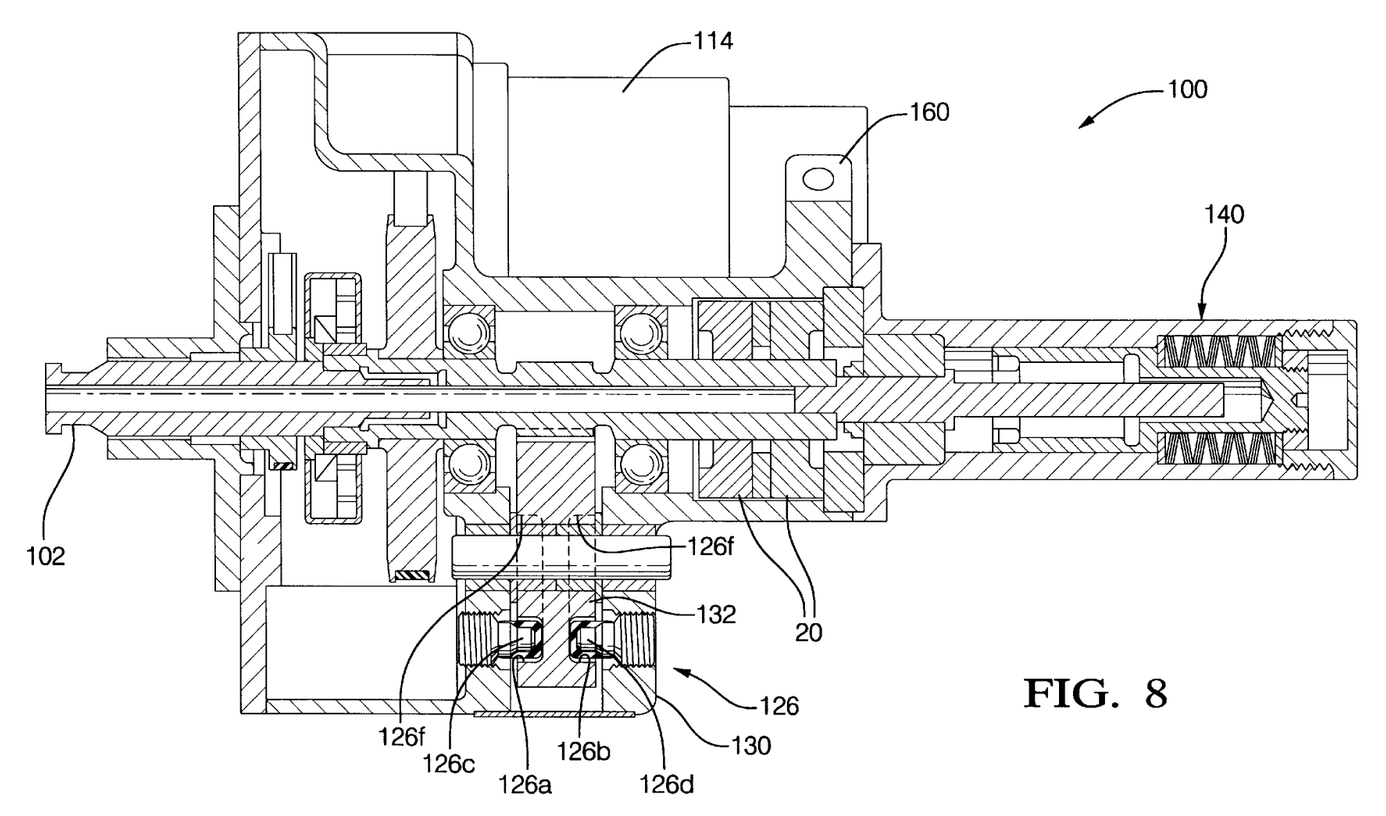
FIG. 8 is a cross section view of an exemplary embodiment of a steer-by-wire handwheel actuator depicted in FIG. 5, Section 8—8.

Returning to FIG. 3 and incorporating FIG. 8, the handwheel actuator 100 illustrates generally a stop mechanism 126 enclosed by housing 130 and comprising the spur gear 110 of the gear train 104 geared to a reducing spur gear 132. Reducing gear 132 further comprises interior arcuate stop guides 126a, 126b, one on either side of the gear 132 having a first stop pin 126c disposed within said stop guide 126a and having a having a second stop pin 126d disposed within stop guide 126b, such that as spur gear 110 rotates, reducing gear 132, and thus spur gear 110, is mechanically restrained as the first stop pin and second stop pin make simultaneous contact with one pair of two ends 126e, 126f of one end of the interior arcuate stop guides 126a, 126b (See FIG. 8). The other end of the internal arcuate stop guides 126a, 126b is not shown. The first stop pin and second stop pin are attached to the housing 130. In an exemplary embodiment, the stop pins 126c, 126d are rubber coated and provide over 100 Nm of overload torque capability.

Still referring to FIG. 3, a modular unit 140 is attached to the shaft 102 that acts as a mechanical back-up device to provide auxiliary steering resistance in the steer-by-wire system 600. Modular unit 140 allows full lock-to-lock travel of the steering handwheel 10 while providing torsional resistance to handwheel rotation up to a specified saturation torque.

Figure 9:
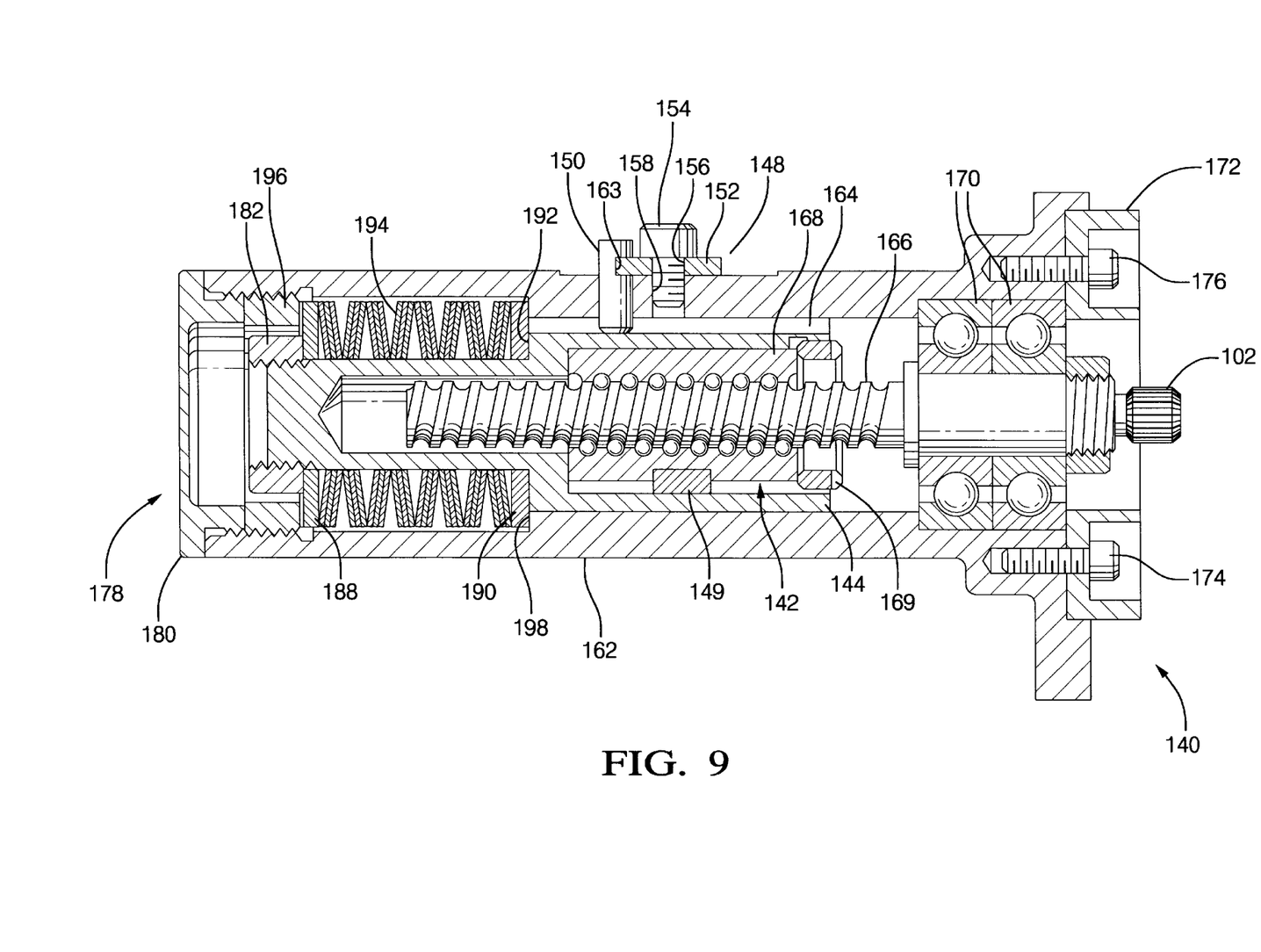
FIG. 9 is a cross section view of a modular unit attached to a steering shaft to provide auxiliary steering resistance.

Referring to FIG. 9, modular unit 140 is shown in more detail and described below. Modular unit 140 provides an adjustable on-center feel and return-to-center mechanism for the steer-by-wire handwheel actuator 100 to provide a passive steering system feel similar to current production hydraulic assisted rack and pinion systems. Modular unit 140 provides the driver with force feedback throughout the range of travel of the handwheel 10. Modular unit 140 comprises a ball screw assembly 142 including a hollow sleeve 144 that slip fits over the ball screw assembly 142 and is rotationally fixed using an anti-rotation pin assembly 148 and a key 149 opposite thereto. Rotation pin assembly 148 includes a pin 150 slidably engaged against an exterior sleeve 144. Anti-rotation pin assembly 148 further includes a pin retainer 152 and screw 154 that is disposed in an aperture 156 of retainer 152 and received in a threaded aperture 158 of housing 162 defining modular unit 140. Pin 150 is configured with a slot 163 positioned thereon to allow a portion of retainer 152 to be received therein while maintaining pin 150 slidably disposed in an aperture formed in housing 162 to engage an outside surface of a sleeve 144 when screw 154 is fixed against retainer 152 by tightening screw 154 in threaded aperture 158. Sleeve 144 has a channel 164 configured on a periphery thereof to allow axial translation of sleeve 144 while limiting rotation thereof. Sleeve 144 engages a threaded portion 166 of shaft 102 via a ball nut 168 disposed in sleeve 144. Ball nut 168 is retained in sleeve 144 with a ball nut retainer nut 169. Ball nut 168 has complementary threads to engage threaded portion 166. Screw shaft 102 is supported in a ball bearing assembly 170 that is disposed at one end in housing 162.

Bearing assembly 170 is retained in housing 162 with a bearing cap 172 that is mechanically fastened to housing 162 with mechanical fasteners 174. A bearing nut 176 is engageable with another threaded portion of shaft 102 to fix shaft 102 relative to bearing assembly 170 which is fixed relative to housing 162. At an opposite end 178 of housing 162 an end cap 180 encloses a cavity formed in housing 162. At the same end 178 a retaining nut 182 is threaded onto the end of sleeve 144 and an external spring return nut 196 is threaded into housing 162. Disposed against retaining nut 196 and retaining nut 182 is a first spring retaining washer 188 having an aperture allowing ball screw 144 to slide therethrough. A second spring retaining washer 190 is disposed against a shoulder 192 of sleeve 144 and shoulder 198 of housing 162. Like washer 188, washer 190 includes an aperture that allows sleeve 144 to slide therethrough. A plurality of biasing members 194 is disposed intermediate washers 188, 190. Each biasing member is preferably a disc spring or Belleville washer. The plurality of biasing members 194 is more preferably a stack of disc springs circumferentially disposed about sleeve 144 while allowing translation of sleeve 144 therethrough. The stack of disc springs are preferably formed by alternating the orientation of contiguous disc springs to provide a compression type biasing member 194. The spring pack or plurality of biasing members 194 is stacked in series to provide desired spring load and maximum travel. The springs are designed and preferably preloaded to a stack height that gives a nonlinear spring rate with a very gradual slope.

Spring retaining nut 182 is preferably configured as an adjustment preload nut that is threaded onto the sleeve 144 and tightened to a specified position to set the appropriate spring preload on the biasing members 194. An external spring return nut 196 has exterior threads threadably engaged with complementary threads in housing 162 at end 178 for engaging washer 188 when sleeve 144 translates toward end 178 pushing washer 192 to compress biasing members 194 which push against washer 188 which is prevented from translating toward end 178 by fixed nut 196. When sleeve 144 translates away from end 178, nut 182 pushes against washer 188 to compress biasing members 194 against washer 192 that is prevented from translating away from end 178 by a shoulder 198 formed in housing 162. The preload on the biasing members 194 is configured to provide an identical bias when shaft 102 is rotated in either direction since the spring pack or plurality of biasing members 194 is configured in a parallel arrangement to bias the shaft indicative of a return-to-center position. It will be recognized that although the plurality of biasing members has been described as a single series stack of disc washers, multiple stacks are also contemplated. More specifically, it is contemplated that a first stack may be disposed on one side of ball nut 168 while a second stack is disposed on the other side of ball nut 168. In this manner, when shaft is rotated in one direction, the first stack is compressed and when shaft 102 is rotated in an opposite direction, the second stack is compressed.

In operation, as the hand wheel 10 is rotated from the center position, the steering shaft 102 rotates at the same speed. As the steering shaft 102 rotates, the ball nut 168 and hence sleeve 144 translates left or right in an axial direction relative to shaft 102 shown in FIG. 9 depending on direction of rotation. When the sleeve 144 translates it compresses the spring stack giving a gradual load increase on the ball nut 168. The axial load increase reflects through the ball nut 168 giving an increasing torque feed back to the driver as the hand wheel 10 is turned further from center. The mechanism will not run out of travel since the hand wheel actuator will reach its end of travel stop before maximum travel of the ball nut 168 is reached. When the driver releases the hand wheel 10 the ball nut 168 will backdrive on the screw due to the axial load imbalance until it reaches the equilibrium load at the center position.

Figure 4:
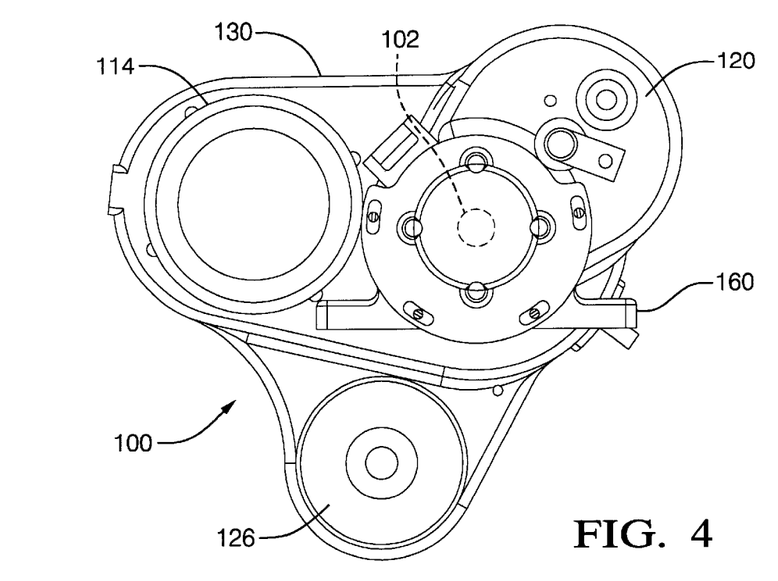
FIG. 4 is a rear/plan view of a an exemplary embodiment of a steer-by-wire handwheel actuator of FIG. 3.
Figure 5:
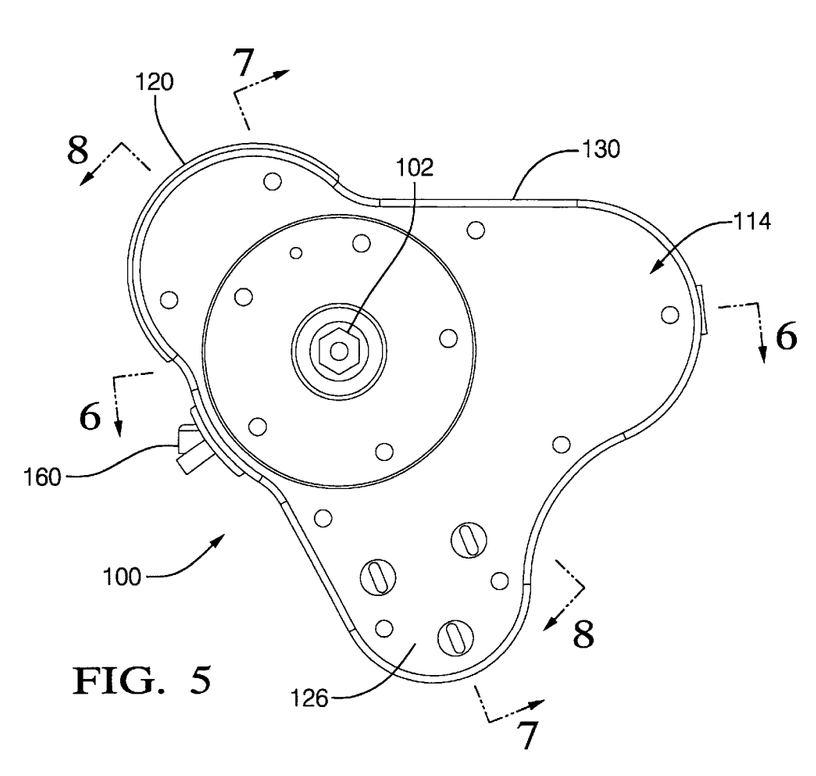
FIG. 5 is a front/plan view of a an exemplary embodiment of a steer-by-wire handwheel actuator shown in FIG. 4 detailing cross sectional divisions that follow.

Turning to FIG. 4, a preferred embodiment depicted in FIG. 3 is shown from the rear, and FIG. 5 illustrates the front/plan view of FIG. 4. FIG. 5 also illustrates three cross sections taken for the Figures referenced above that follow. FIGS. 4 and 5 illustrate the housing 130 coupled to a bracket 160 for attaching a handwheel actuator to a vehicle mounting interface.

Figure 6:
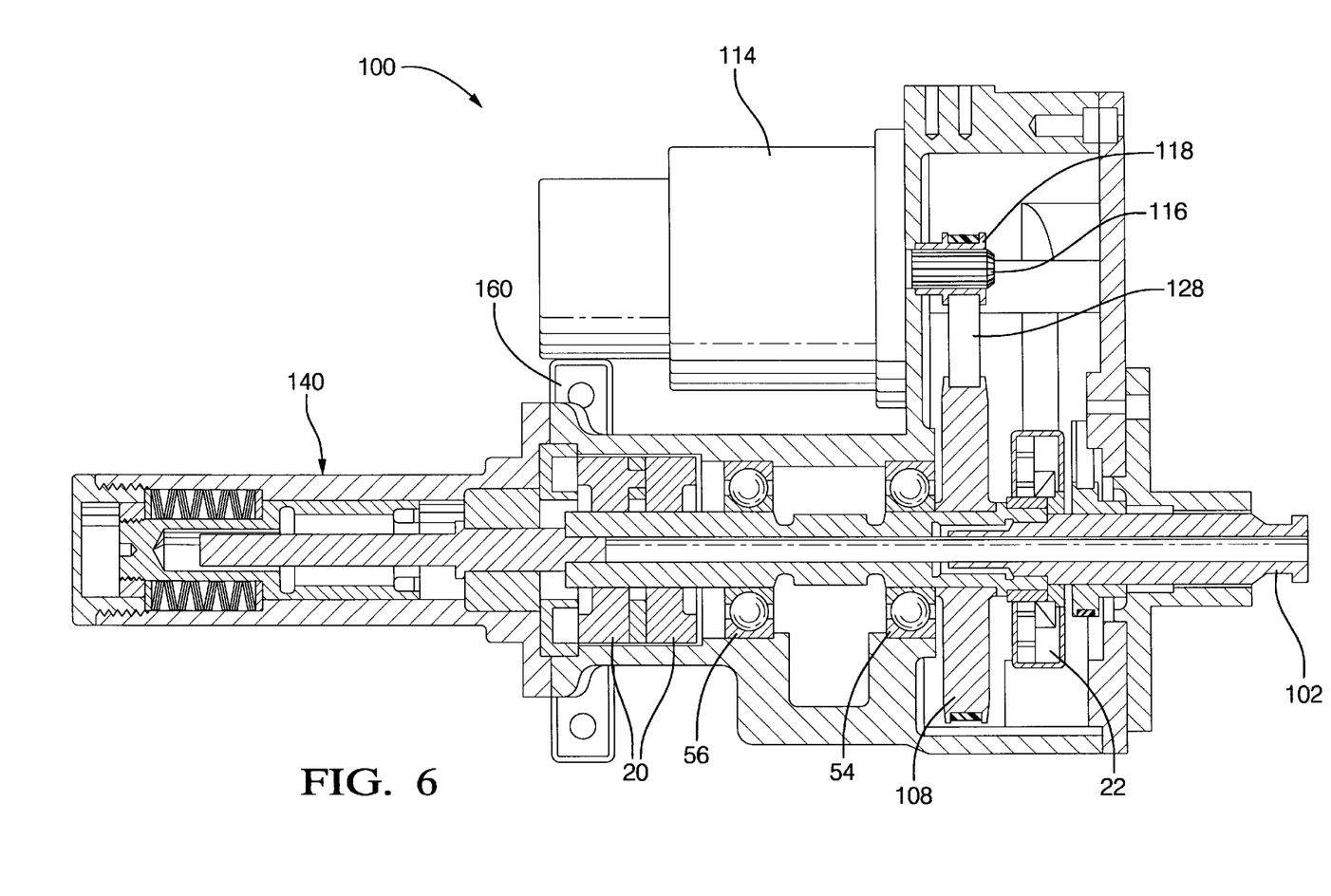
FIG. 6 is a cross section view of an exemplary embodiment of a steer-by-wire handwheel actuator depicted in FIG. 5, Section 6—6.
Figure 7:
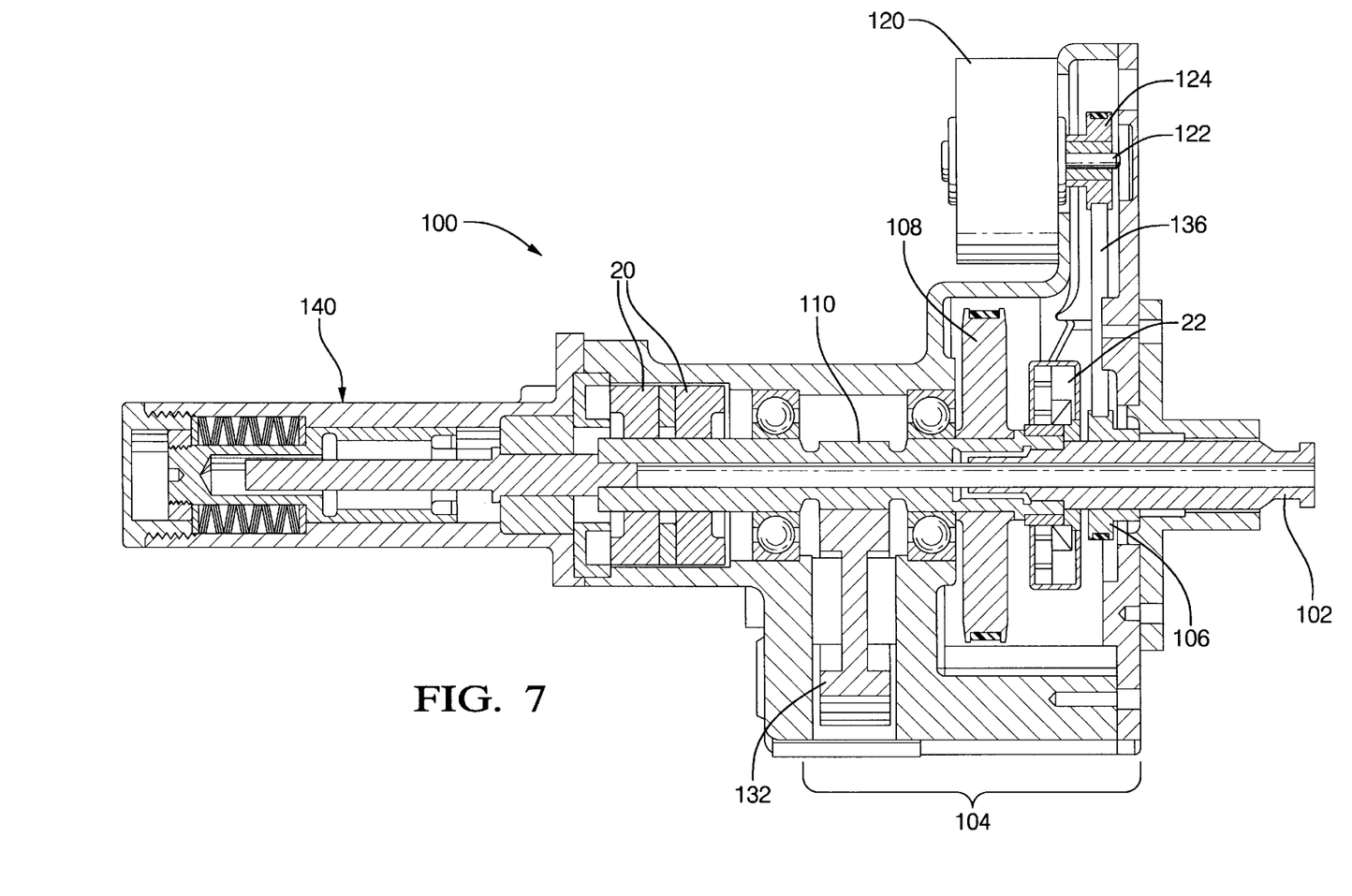
FIG. 7 is a cross section view of an exemplary embodiment of a steer-by-wire handwheel actuator depicted in FIG. 5, Section 7—7.

In FIG. 2, in conjunction with FIGS. 6 and 7, the handwheel actuator 100 is operative to accept as input thereto, firstly, steering commands by way of the driver input shaft 102 from an outside motive source such as a driver 500, secondly, the first control signal 100a from the controller 400 to the motor 114 and thirdly, a second control signal 100b from the controller 400 to the electromechanical brake 120. The steering commands are typically the clockwise or counterclockwise rotation of the driver input shaft 102. The first control signal 100a originating from the controller 400 controls the input to the speed reducer pulley 124 by the motor 114. The second control signal 100b controls a feedback torque directed to the driver input shaft 102 by the electro-mechanical brake 120.

In FIGS. 6 and 7, the clockwise or counterclockwise rotation of the driver input shaft 102 instigates the action of the speed reducer pulley 124. By way of pulley 108 the motor shaft 116 is positively driven by belt 128. Such engagement results in a gear ratio, $R_1$, of the speed reducer pulley 124. As vehicular operating conditions change, e.g., a change in vehicular speed or a change in the position of the driver input shaft 102, plus the application of road forces acting upon the steer-by-wire system 600 (See FIG. 2), the first control signal 100a, based upon the changing operating conditions, activates the motor 114 so as to control speed reducer pulley 124, namely resisting or assisting to the motion of reducing pulley 108 and allowing controlled rotation thereof. Based upon the aforesaid changing operating conditions, the second control signal 100b from the controller 400 activates the electro-mechanical brake 120 so as to provide a resistive torque to the speed reducer 104 by way of the engagement of the electro-mechanical brake 120 to the driver input shaft 102 through the electro-mechanical brake shaft 122, the pulley 124, belt 136, and the driver feedback pulley 106. The resistive torque results in a feedback torque that provides the driver 500 with additional tactile response to steering commands.

Figure 10:
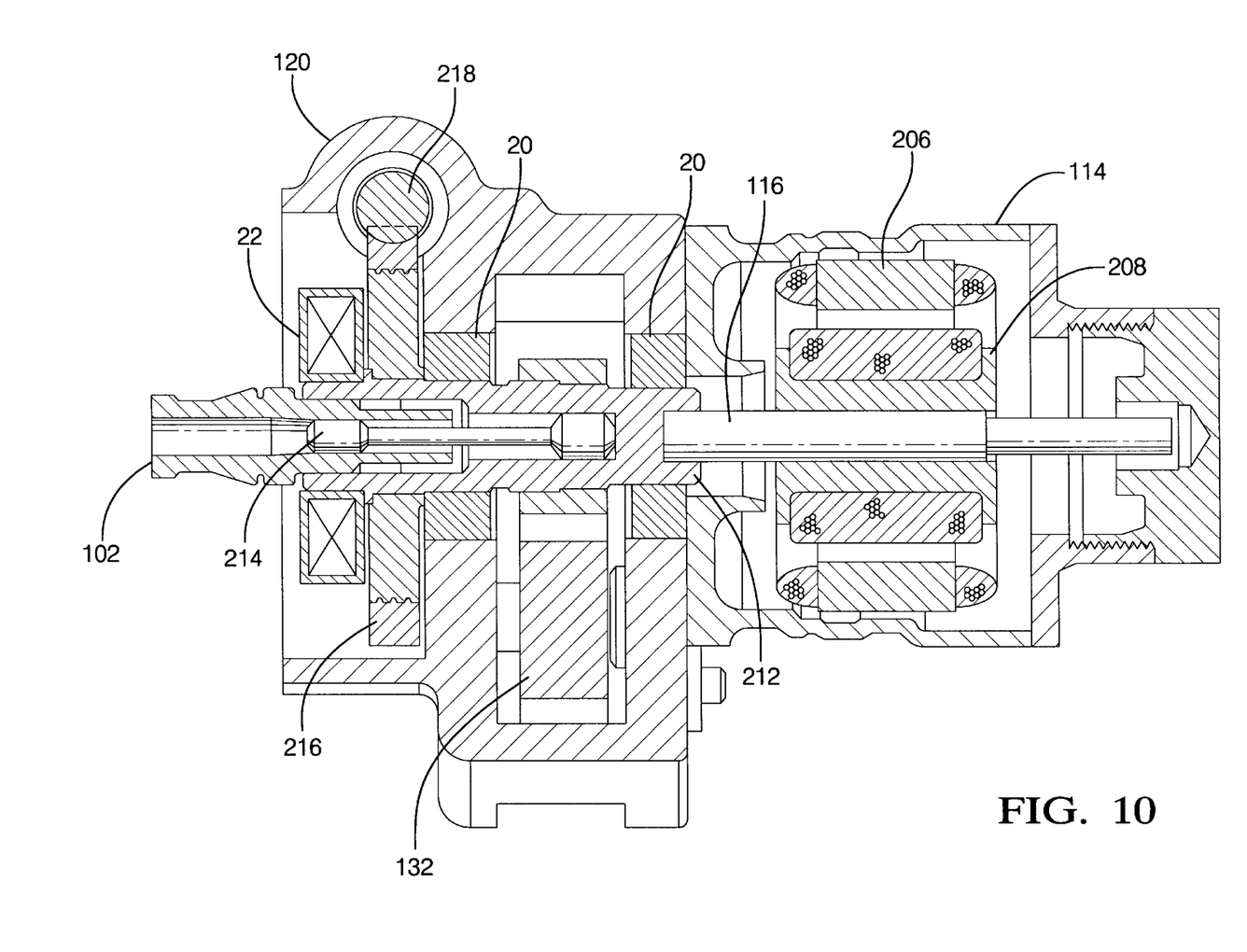
FIG. 10 is a cross section view of an alternative embodiment of the steer-by-wire handwheel actuator of FIG. 3 with a combination worm gear and direct drive power transmission.
Figure 11:
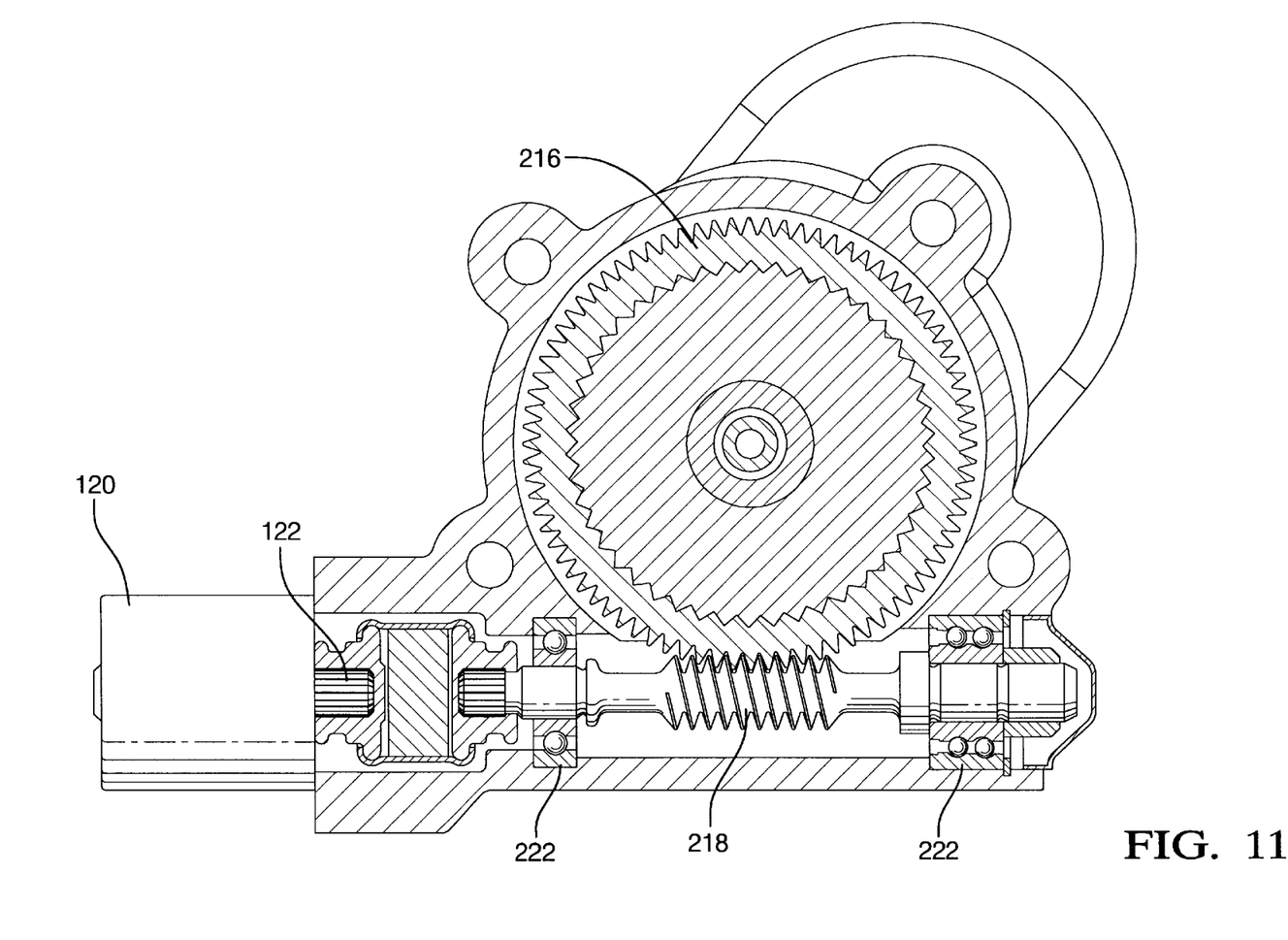
FIG. 11 is another cross section view of the alternative embodiment of the steer-by-wire handwheel actuator of FIG. 10 with worm gear power transmission taken perpendicular to the view of FIG. 10.

Referring now to FIGS. 10 and 11, an alternative embodiment for eliminating pulleys 118,108 and 124,106 and corresponding belts 128 and 136, respectively, are illustrated. Motor 114 is in direct drive relationship with motor shaft 116 operably connected to shaft 102 absent a connection via a speed reducer. Motor 114 includes a motor stator 206 surrounding a motor rotor 208 operably connected to shaft 116 for rotation thereof when rotor 206 is energized. Motor shaft 116 is connected to driver input shaft 102 via a sleeve assembly 212 having a torsion bar 214 disposed therein for torque sensing by torque sensor 22. Sleeve assembly 212 is connected to a worm gear 216 that is engaged to a worm 218. Worm 218 is rotatably supported between two bearings 222 and is operably connected to brake 120 via shaft 122 at one end thereof. In an exemplary embodiment, brake 120 provides up to about 6 Nm of torque feedback by braking that is transmitted to worm 218, worm gear 216, to sleeve assembly 212, and then to driver input shaft 102, while motor 114 provides up to about 4 Nm of torque feedback in conjunction with the 6 Nm from brake 120 to driver input shaft for a total of up to about 10 Nm. Motor 114 generates the torque through shaft 116, to sleeve assembly 212, and then to the driver input shaft 102. Using the worm and worm gear drive with the direct drive motor connection, zero lash and comparable noise are experienced compared with the belt drive previously described above.

It will be understood that a person skilled in the art may make modifications to the preferred embodiment shown herein within the scope and intent of the claims. While the present invention has been described as carried out in a specific embodiment thereof, it is not intended to be limited thereby but intended to cover the invention broadly within the scope and spirit of the claims.

What claimed is:

1. A steer-by-wire handwheel actuator utilizing a controller operative to accept as input thereto data from the steer-by-wire system and generate therefrom control signals in a vehicle comprising:
   a driver input shaft;
   a sear train connected to the driver input shaft;
   a motor responsive to the control signals from the controller and variably seared to the gear train;
   an electro-mechanical brake responsive to the control signals from the controller and geared to one of the driver input shaft and the gear train; and
   a stop mechanism attached to a housing and coupled to one of the electro-mechanical brake and the gear train,
   wherein the gear train is a pulley and gear train assembly, said gear train assembly including:
      a driver feedback pulley connected to the driver input shaft;
      a speed reducer pulley connected to the driver input shaft; and
      a spur gear connected to the driver input shaft.

2. The steer-by-wire handwheel actuator as set forth in claim 1 wherein the motor includes:
   a motor shaft driven therefrom; and
   a motor pulley connected to the motor shaft and positively engaged to the speed reducer pulley.

3. The steer-by-wire handwheel actuator as set forth in claim 1 wherein the speed reducer pulley further comprises cogs circumferentially arranged for positive engagement with the motor pulley having corresponding cogs circumferentially arranged.

4. The steer-by-wire handwheel actuator as sec forth in claim 3 wherein the speed reducer pulley and the motor pulley are positively engages via a cogged belt.

5. The steer-by-wire handwheel actuator as set forth in claim 1 wherein the motor is a brushless motor and includes:
   a motor shaft driven therefrom; and
   a motor pulley connected to the motor shaft and positively coupled to the cogs of the speed reducer pulley.

6. The steer-by-wire handwheel actuator as set forth in claim 1 wherein the electro-mechanical brake includes:
   an electro-mechanical brake shaft driven therefrom; and
   an electro-mechanical brake pulley connected to the electro-mechanical brake shaft and coupled to the gear train.

7. The steer-by-wire handwheel actuator as set forth in claim 1 wherein the electro-mechanical brake is one of a magnetic particle brake and an electro-rheological device that includes:
   an electro-mechanical brake shaft driven therefrom; and
   an electro-mechanical brake pulley connected to the electro-mechanical brake shaft and coupled to the gear train.

8. The steer-by-wire handwheel actuator as set forth in claim 1 wherein the electro-mechanical brake includes:
   an electro-mechanical brake shaft driven therefrom; and
   an electro-mechanical brake pulley connected to the electro-mechanical brake shaft and coupled to the driver feedback pulley.

9. The steer-by-wire handwheel actuator as set forth in claim 1 wherein the electro-mechanical brake is one of a magnetic particle brake and an electro-theological device that includes:
   an electro-mechanical brake shaft driven therefrom; and
   an electro-mechanical brake pulley connected to the electro-mechanical brake shaft and coupled to the driver feedback pulley.

10. The steer-by-wire handwheel actuator as set forth in claim 1 wherein the stop mechanism includes:
    a stop guide having a first stop end and a second stop end; and
    a reducing spur gear coupled to the gear train and the stop guide and operative thereby to travel between the first and second stop ends.

11. The steer-by-wire handwheel actuator as set forth in claim 1 wherein the stop mechanism includes:
    a stop guide having a first stop end and a second stop end; and
    a reducing spur gear having the stop guide and operative thereby to rotate between the first and second stop ends.

12. The steer-by-wire handwheel actuator as set forth in claim 1 wherein the stop mechanism includes:
    a reducing spur gear coupled to the gear train and having at least one stop guide having a first stop end and a second stop end; and
    at least one pin with one end disposed within said at least one stop guide and attached at other end to the housing; said reducing gear operative to rotate therewith between the first stop end and the second stop end.

13. The steer-by-wire handwheel actuator as set forth in claim 1 wherein the stop mechanism includes:
    a reducing spur gear coupled to the spur gear of the gear train and having at least one stop guide having a first stop end and a second stop end; and
    at least one pin with one end disposed within said at least one stop guide and attached at other end to the housing; said reducing gear operative to rotate therewith between the first stop end and the second stop end.

14. The steer-by-wire handwheel actuator as set forth in claim 1 wherein the said at least one pin is rubber coated to dampen end-to-end travel limits.

15. The steer-by-wire handwheel actuator as set forth in claim 1 further comprising:
    a modular unit having a biasing member to provide mechanical resistance to one of the driver input shaft and the gear train.

16. The steer-by-wire handwheel actuator as set forth in claim 15 wherein the modular unit includes a ball nut assembly operably connected to said driver input shaft.

17. The steer-by-wire handwheel actuator as set forth in claim 16 wherein said ball nut assembly is biased in a predetermined position corresponding to an on center steering position.

18. The steer-by-wire handwheel actuator as set forth in claim 17 wherein said ball nut assembly comprises:
   a modular unit housing having at least one shaft opening, said at least one shaft opening being aligned with said driver input shaft;
   a ball screw shaft for linking to said driver input shaft, said ball screw shaft having a threaded surface;
   a ball nut circumferentially disposed about said ball screw shaft; said ball nut having threads configured therein for meshing engagement with said threaded surface of said ball screw, said ball nut in operable communication with said biasing member;
   at least one contact bearing in said housing for allowing rotation and preventing axial movement of said ball screw shaft; and
   a means for operably allowing translation of said ball nut when said bail screw shaft is rotated while limiting rotation of said bail nut, wherein rotation of said ball screw shaft in any direction increases a biasing farce from said biasing member to return said driver input shaft to said predetermined position.

19. The steer-by-wire handwheel actuator as set forth in claim 18 wherein said biasing member includes a biasing member operably engaged with either side of said ball nut, each biasing member imparting an increasing force dependent on a direction of rotation of said ball screw shaft.

20. The steer-by-wire handwheel actuator as set forth in claim 18 wherein said biasing member operably engages a first flange and a second flange defining a groove on said ball nut, rotation of said ball screw shaft in a first direction causes translation of said ball nut results in said first flange compressing said biasing member, rotation of said ball screw shaft in a second direction opposite said first direction results in said second flange compressing said biasing member.

21. The steer-by-wire handwheel actuator as set forth in claim 18 wherein means include a pin extending into said housing into a complementary groove in said ball nut configured to allow axial translation relative to said ball screw shaft while limiting rotation of said ball nut.

22. The steer-by-wire handwheel actuator as set forth in claim 20 wherein said pin further includes a circumferential channel configured in at least a portion thereof, said channel configured to receive an edge of a washer that is mechanically fastened to said housing, said washer operably securely retains said pin at a suitable height for allowing slidable translation and limiting rotation of said ball nut having said groove in operable communication with said pin.

23. The steer-by-wire handwheel actuator as set forth in claim 1 wherein said motor provides up to about 4 Nm of torque feedback to said driver input shaft in conjunction with said electro-mechanical brake providing up to about 6 Nm torque feedback to said driver input shaft.

24. A steer-by-wire handwheel actuator in a vehicle comprising:
   a controller operative to accent as input thereto data from the steer-by-wire system and generate therefrom control signals;
   a driver input shaft;
   a gear train connected to the driver input shaft;
   a motor responsive to the control signals from the controller and variably seared to the sear train;
   a electro-mechanical brake responsive to the control signals from the controller and geared to one of the driver input shaft and the gear train;
   a stop mechanism attached to a housing and coupled to one of the electro-mechanical brake and the gear train; and
   a modular unit having a biasing member to provide mechanical resistance to one of the driver input shaft and the gear train,
   wherein the gear train is a pulley and gear train assembly including
      a driver feedback pulley connected to the driver input shaft;
      a speed reducer pulley connected to the driver input shaft; and
      a spur gear connected to the driver input shaft.

25. The steer-by-wire handwheel actuator as set forth in claim 24 wherein the motor includes:
   a motor shaft driven therefrom; and
   a motor pulley connected to the motor shaft and positively engaged to the speed reducer pulley.

26. The steer-by-wire handwheel actuator as set forth in claim 25 wherein the speed reducer pulley further comprises cogs circumferentially arranged for positive engagement with the motor pulley having corresponding cogs circumferentially arranged.

27. The steer-by-wire handwheel actuator as set forth in claim 26 wherein the speed reducer pulley and the motor pulley are positively engages via a cogged belt.

28. A steer-by-wire handwheel actuator in a vehicle comprising:
   a driver input shaft;
   a sear train connected to the driver input shaft;
   a electro-mechanical brake responsive to control signals and operably coupled to one of the driver input shaft and the gear train; and
   a stop mechanism attached to a housing and coupled to one of the electro-mechanical brake and the gear train, said stop mechanism configured as a mechanical stop defining end-to-end travel limits of said driver input shaft,
   wherein the gear train is a pulley and gear train assembly, said gear train assembly including:
      a driver feedback pulley connected to the driver input shaft;
      a speed reducer pulley connected to the driver input shaft; and
      a spur gear connected to the driver input shaft.

29. The steer-by-wire handwheel actuator as set forth in claim 28 herein the electro-mechanical brake includes:
   an electro-mechanical brake shaft driven therefrom; and
   an electro-mechanical brake pulley connected to the electro-mechanical brake shaft and coupled to the gear train.

30. The steer-by-wire handwheel actuator as set forth in claim 28 wherein the stop mechanism includes:
   a reducing spur gear coupled to the spur gear of the gear train and having at lease one stop guide having a first stop end and a second slop end; and
   at least one pin with one end disposed within said at least one stop guide and attached at other end to the housing;

said reducing gear operative to rotate therewith between the first stop end and the second stop end.

31. The steer-by-wire wheel actuator as set forth in claim 30 wherein the said at least one pin is rubber coated to dampen end-to-end travel limits.

32. The steer-by-wire handwheel actuator as set forth in claim 28 further comprising:

a modular unit having a spring to provide mechanical backup resistance to one of the driver input shaft and the gear train.

33. The steer-by-wire handwheel actuator as set forth in claim 32, wherein the modular unit includes a bail nut assembly operably connected to said driver input shaft.

34. The steer-by-wire handwheel actuator as set forth in claim 33 wherein said ball nut assembly is biased in a predetermined position corresponding to an on center steering position.

35. The steer-by-wire handwheel actuator as set forth in claim 34 wherein said ball nut assembly comprises:

a modular unit housing having at least one shaft opening, said at least one shaft opening being aligned with said driver input shaft;

a ball screw shaft for linking to said driver input shaft, said ball screw shaft having a threaded surface;

a ball nut circumferentially disposed about said ball screw shaft; said ball nut having threads configured therein for meshing engagement with said threaded surface of said ball screw, said ball nut in operable communication with said biasing member;

at least one contact bearing in said housing for allowing rotation and preventing axial movement of said ball screw shaft; and a means for operably allowing translation of said ball nut when said ball screw shaft is rotated while limiting rotation of said ball nor, wherein rotation of said ball screw shaft in any direction increases a biasing force from said biasing member to return said driver input shaft to said predetermined position.

36. The steer-by-wire handwheel actuator as set forth in claim 35 wherein said biasing member includes a biasing member operably engaged with either side of said ball nut, each biasing member imparting an increasing force dependent on a direction of rotation of said ball screw shaft.

37. The steer-by-wire handwheel actuator as set forth in claim 35 wherein said biasing member operably engages a first flange and a second flange defining a groove on said ball nut, rotation of said ball screw shaft in a first direction causes translation of said ball nut results in said first flange compressing said biasing member, rotation of said ball screw in a second direction opposite said first direction results in said second flange compressing said biasing member.

38. The steer-by-wire handwheel actuator as set forth in claim 35 wherein said means include a pin extending into said housing into a complementary groove in said ball nut configured to allow axial translation relative to said ball screw shaft while limiting rotation of said ball nut.

39. The steer-by-wire handwheel actuator as set forth in claim 38 wherein said pin further includes a circumferential channel configured in at least a portion thereof, said channel configured to receive an edge of a washer that is mechanically fastened to said housing, said washer operably securely retains said pin at a suitable height for allowing slidable translation and limiting rotation of said ball nut having said groove in operable communication with said pin.

40. The steer-by-wire handwheel actuator as set forth in claim 28 wherein said motor provides up to about 4 Nm of torque feedback to said driver input shaft in conjunction with said electro-mechanical brake providing up to about 6 Nm torque feedback to said driver input shaft.

* * * * *